MANUFACTURE OF HOLLOW ARTICLES

Original Filed July 1, 1963 4 Sheets-Sheet 1

INVENTOR
David T. N. Williamson

By Watson, Cole, Grindle & Watson
ATTORNEYS

MANUFACTURE OF HOLLOW ARTICLES

Original Filed July 1, 1963 4 Sheets-Sheet 2

INVENTOR
David T. N. Williamson
By Watson, Cole, Grindle & Watson
Attorneys

MANUFACTURE OF HOLLOW ARTICLES

Original Filed July 1, 1963 4 Sheets-Sheet 3

INVENTOR
David T. N. Williamson
By Watson, Cole, Grindle & Watson
ATTORNEYS

MANUFACTURE OF HOLLOW ARTICLES

Original Filed July 1, 1963 4 Sheets-Sheet 4

INVENTOR
David T. N. Williamson
By Watson, Cole, Grindle & Watson
ATTORNEYS

United States Patent Office

Re. 27,277
Reissued Jan. 18, 1972

27,277

MANUFACTURE OF HOLLOW ARTICLES

David T. N. Williamson, London, England, assignor to Molins Limited, London, England Original No. 3,266,295, dated Aug. 16, 1966, Ser. No. 291,905, July 1, 1963. Application for reissue Apr. 7, 1970, Ser. No. 26,447
Int. Cl. G01n *15/08;* G01m *3/02*
U.S. Cl. 73—38 29 Claims

Matter enclosed in heavy brackets [ ] appears in the original patent but forms no part of this reissue specification; matter printed in italics indicates the additions made by reissue.

*ABSTRACT OF THE DISCLOSURE*

*Apparatus for testing cigarettes, rod-like articles and in particular cigarette wrappers for leaks. The wrappers are tested while traveling sideways on a conveyor past a rotary drum testing station. A pressure differential is created radially across the wrapper, preferably by applying suction to a chamber around the wrapper. The arrangement is such that the presence of a leak is indicated by an increase in the air flow through the wrapper.*

This invention concerns improvements in or relating to devices for testing the wrappers of wrapped rods having unwrapped ends. The expression "wrapped rod" where used herein is to be understood as meaning an article which has a tubular wrapper enclosing an air-pervious filler, the wrapper being open at the ends to expose the ends of the filler. One example of a wrapped rod is a cigarette, which may consist entirely of a paper wrapper and a tobacco filler, or may also include a mouthpiece portion (such as a filter plug) at one end, and such a mouthpiece portion may be enclosed with the tobacco in a common wrapper, or may be joined to the tobacco-containing part of the cigarette by a uniting band wrapped around both the mouthpiece portion and the tobacco-containing part. A further example of a wrapped rod is an assemblage of two cigarette lengths and a double-length mouthpiece portion lying between, and pointed to, the cigarette lengths. Such an assemblage is frequently manufactured as an intermediate product in the manufacture of mouthpiece cigarettes, and is intended to be subdivided by cutting through the central mouthpiece portion. A still further example of a wrapped rod is a length of mouthpiece material consisting of a filler of some air-pervious material (often intended to act as a smoke filter) enclosed in a wrapper.

A rod containing tobacco or mouthpiece material is usually enclosed in a paper wrapper, which is usually sealed about the filler by a pasted seam running lengthwise of the rod. However, the seam may be formed by other methods than pasting, for example by crimping. A uniting band used to join a mouthpiece portion to a cigarette-length may also be made of paper, or may be made of other suitable materials, and such a uniting band is also usually secured by a pasted seam.

It is to be understood that the term "wrapper" where used herein is meant to include not only a single wrapper enclosing the entire filler (e.g. a filler of tobacco, or of mouthpiece material, or consisting of a portion of each) but also a uniting band which joins a mouthpiece portion to one or more cigarette lengths or wrapped tobacco fillers.

Any such wrappers may consist of material which normally has some degree of porosity and is therefore to some extent air-permeable. However, the present invention is concerned with the detection of excessive air-permeability in the wrapper of a rod. This might result from a hole in the wrapper, or from a gap between two overlapped edge portions of the wrapper which constitute a seam, such a gap being caused by failure of those portions to adhere to each other completely. Also, in rods consisting of two parts abutted end to end and joined by a uniting band (a common example being a mouthpiece cigarette consisting of a cigarette length joined to a mouthpiece portion) it sometimes occurs that the two abutted parts does not match each other, for example by having slightly different diameters, in which case the uniting band may be incompletely secured to one of the parts leaving a gap through which air can flow. In the case of a mouthpiece cigarette, for example, the mouthpiece portion may have a slightly larger cross-sectional size than the cigarette part, and this may result in an incomplete adherence of the uniting band to the cigarette part, so that at one or more positions around the circumference of the cigarette part, the uniting band is not stuck down and air can flow between the uniting band and the wrapper of the cigarette part, and so enter the cigarette.

According to the present invention there is provided a testing device for testing the wrappers of wrapped rods having unwrapped ends, the device including sealing means having parts arranged to engage the rod closely to seal off the exterior of the wrapper from the unwrapped ends of the rod, a chamber to receive a part of the rod, and suction means to apply suction to the said chamber, the said chamber and sealing means being so disposed that the action of the suction means establishes a difference in air pressure betwen the interior of the rod and a space surounding the exterior of the wrapper, and that any air flow occurring as a result of the establishment of such pressure difference, is an air flow through the wrapper into the said chamber, whereby any such air flow beyond a predetermined minimum indicates a leak in the wrapper.

The said chamber may enclose at least the greater part of the exterior of the wrapper, and the device may include means to enable air to enter the rod through at least one of its unwrapped ends. There may also be provided closure means to close one of the unwrapped ends of the rod, in which case there may be provided detector-means responsive to flow of air into the other end of the rod. The device may include a detector-chamber to enclose the said other end of the rod, and means to indicate a decrease in air pressure in said detector-chamber, beyond a predetermined minimum, resulting from said pressure difference.

The device may include means to enable air to enter the rod through at least one of its unwrapped ends, and detector-means responsive to air flow into such end. For example the device may include a movable element so located as to be adjacent an unwrapped end of the rod, and adapted to move in response to air flow into said end. Air may be enabled to enter the rod through both its ends, in which case two such movable elements are provided adjacent the said ends. Each said movable element may form a part of a capacitor whose capacitance is changed by movement of the movable element.

The said chamber may be arranged to enclose an unwrapped end of a rod and to communicate with the interior of the rod, the device including also a detector-chamber to enclose the greater part at least of the exterior of the wrapper, and means to indicate a decrease in air pressure in said detector-chamber, beyond a predetermined minimum, resulting from said pressure difference. In such an arrangement, means may be provided to close the other unwrapped end of the rod.

In any device as set out above, there may be included detector means to detect a change of air pressure resulting from the establishment of the said pressure difference, such change resulting from a flow of air through the wrapper.

The said detector-means may be responsive to flow of air into an unwrapped end of the rod caused by decrease in air pressure in the chamber.

The device may include a first conveyor provided with receivers for rods, a further conveyor opposed to the first and provided with receivers for rods, the receivers on one conveyor being adapted to come successively into register with receivers on the other, wherein the two opposed receivers of a pair, when in register with each other, together provide the said chamber and the said sealing means. One of the said conveyors may be a rotatable drum whose interior is connected to a source of suction, and the device may include pneumatic means, arranged to be actuated as a result of a testing operation, to segregate unsatisfactory rods from satisfactory rods.

Testing devices in accordance with the invention will now be described by way of example with reference to the accompanying drawings, in which.

Figure 1:
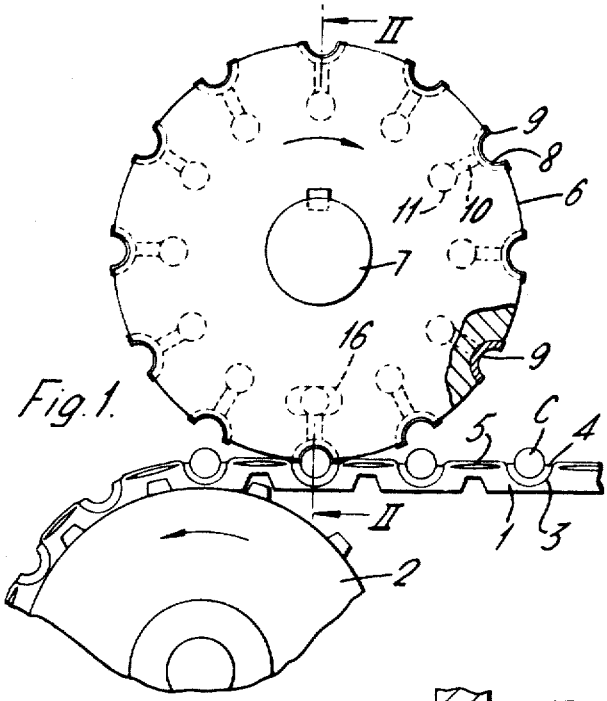
FIGURE 1 is an end elevation of one construction.
Figure 2:
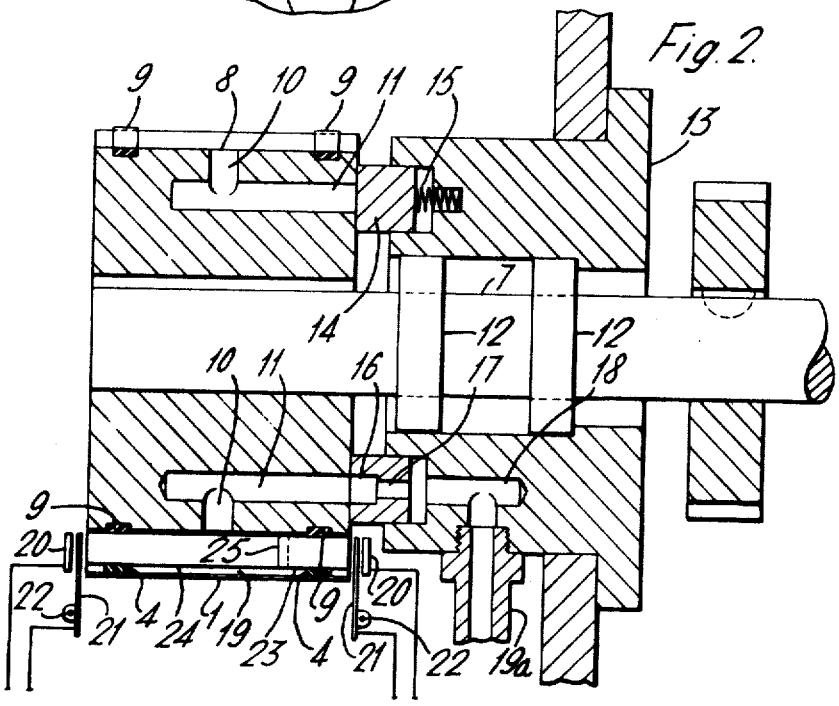
FIGURE 2 is a section on the line II—II of FIGURE 1.

Referring to FIGURES 1 and 2, cigarettes C are conveyed laterally on a moving conveyor band 1 which passes about a rotating wheel 2. The band 1 is made of flexible material and is provided with flutes 3 in which the cigarettes are supported, each flute having two substantially semi-circular pads 4 on which a cigarette rests, the pads 4 being formed of soft, air-impervious rubber and positioned adjacent the two ends of the cigarette supported in the flute (see FIGURE 2). The portions of the band 1 between the flutes 3 are provided with slits 5, so that these parts of the band 1 can be deformed, for a reason to be described later.

Positioned above the band 1 is a drum 6 mounted on a rotatable shaft 7, and provided with peripheral flutes 8 arranged lengthwise of the drum. As the drum 6 rotates, each flute 8 registers in turn with a flute 3 on the band 1 at a testing position at the lowest part of the drum's periphery. In each flute 8 are two semi-circular pads 9 which are similar to and can register with the pads 4 in the flutes 3. Leading from each flute 8 is a hole 10 radial of the drum 6 which communicates with a longitudinal hole 11 (see FIGURE 2), leading to an end face of the drum.

Referring now to FIGURE 2, the shaft 7 is rotatably mounted in bearings 12 supported in a bracket 13. A stationary carbon ring 14 is urged against the drum 6 by springs 15. In the lower portion of the ring 14 is provided an arcuate slot 16 (see FIGURE 1) with which the holes 11 can register. A duct 17 connects the slots 16 through a hole 18 in the bracket 13 to a source of suction (not shown) connected to the hole 18 by a pipe 19a.

The peripheral speed of the drum 6 is equal to the speed of the conveyor band 1 and as each cigarette C carried in a flute 3 passes beneath the drum 6, a flute 8 registers with the flute 3 and the cigarette C is held between the pads 9 and 4 in the two registering flutes. The pads 9 and 4 deform to enclose and assume the shapes of the rods so as to form two air-tight seals adjacent its two ends, thus sealing off the exterior of the wrapper from the unwrapped ends of the rod. Thus, an airtight chamber 19 (see FIGURE 2) is formed around the exterior of the wrapper of the cigarette C. Suction is applied through the hole 10 to the chamber while the hole 11 registers with the slot 16, thus establishing a difference in air pressure between the interior of the rod and the chamber, and if the cigarette C is faulty, i.e. if air can pass through the wrapper, air will flow through the exposed ends of the filler and through the fault in the wrapper (e.g. a gap in the seam of the wrapper) into the chamber 19, due to the reduction in air pressure in the chamber. If, on the other hand, the cigarette is not faulty in that respect, no air, or no significant amount of air, can flow into the chamber 19, as the wrapper material is relatively air-impervious.

The portions of the band 1 between the flutes 3 cooperate with the peripheral portions of the drum 6 between the flutes 8 to assist in sealing the chamber 19, there being interference between these portions, and the slits 5 allowing the portions of the band to deform to take up the interference.

Referring again to FIGURE 2, positioned adjacent the two ends of the cigarette at the testing position are capacitors, each having a fixed plate 20 and a movable plate 21 pivoted at 22. If the cigarette being tested is faulty the flow of air through an exposed end of the filler will cause one of the plates 21 to move towards the cigarettes. Such movement will cause a change in capacitance of the capacitor, which change is used to operate rejecting mechanism, of any suitable kind, to reject the faulty cigarette.

In the construction shown the cigarettes C are mouthpiece cigarettes each having a mouthpiece portion 23 connected to a cigarette length 24 by an encircling uniting band 25 which is wrapped around the mouthpiece portion so as to overlap one end of the cigarette length to which it adheres. Thus, if the mouthpiece portion is not correctly joined to the cigarette portion, e.g. if the overlapping portion of the uniting band 25 is not correctly sealed and there is a gap, air will be able to pass through the gap and thus the cigarette will be rejected. It will be appreciated, however, that the apparatus can also be used with cigarettes not having a mouthpiece portion, and can be used to detect cigarettes in which, for example, the seam of the cigarette paper wrapper is not correctly sealed, or in which, for any other reason, the wrapper is air-pervious.

Further, the invention can also be used for testing assemblages each of which consists of two cigarette lengths with a double-length mouthpiece portion between and in endwise abutment and axial alignment therewith, the cigarette lengths and mouthpiece portion being joined by an encircling uniting band covering the whole of the mouthpiece portion and the end portions of the cigarette lengths, or alternatively, the parts being joined by two relatively narrow encircling bands covering the two adjoining end portions of the mouthpiece portion and cigarette lengths.

In the latter case, if it is desired only to test the seams of the encircling uniting bands, the device could be modified by arranging that the pads 4 and 9 are located so as to enclose only the uniting bands on the chamber 19.

Figure 3:
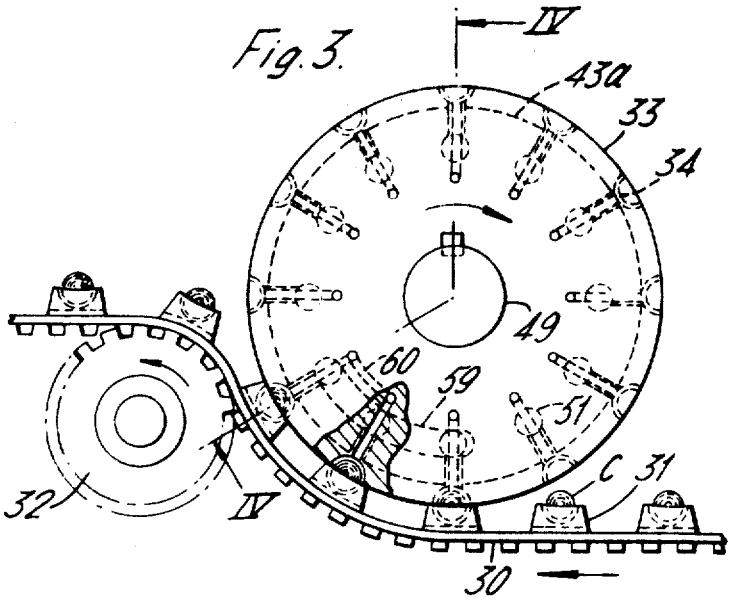
FIGURE 3 is an end elevation of an alternative construction.
Figure 4:
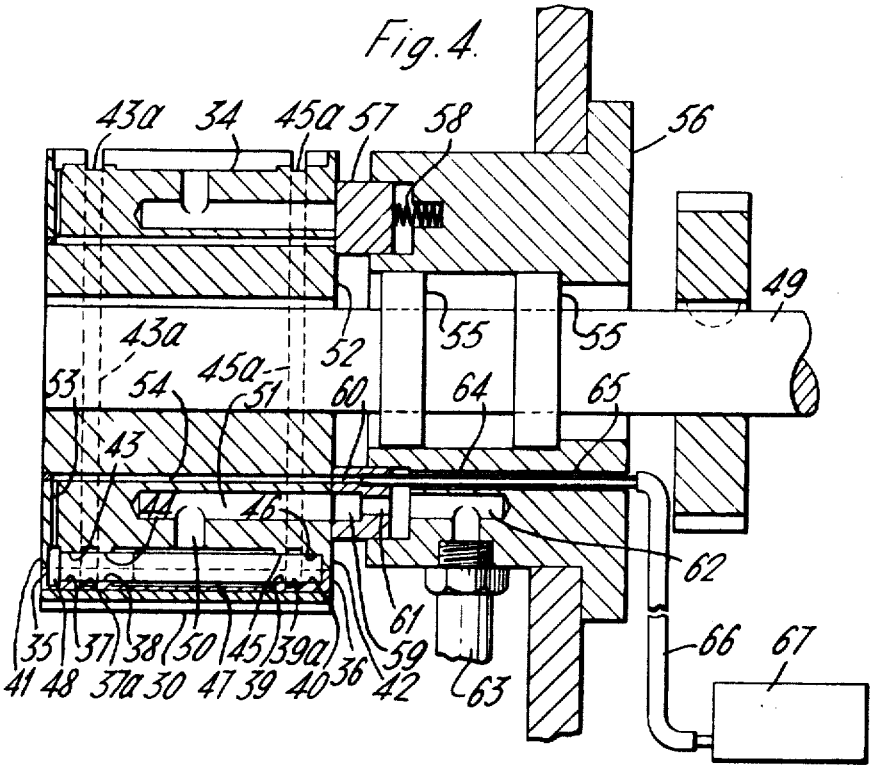
FIGURE 4 is a section on the line IV—IV of FIGURE 3.

An alternative construction is illustrated in FIGURES 3 and 4.

Referring to FIGURE 3, cigarettes C are conveyod sideways on a continuously movable endless conveyor which comprises a flexible band 30 carrying fluted metal elements 31 in each of which a cigarette rests, and which will be more fully described later. The conveyor, guided by a rotatable wheel 32, passes about part of the periphery of a rotatable member in the form of a drum 33 having longitudinal peripheral flutes 34 to be more fully described later. The spacing of the flutes 34 around the drum 33 corresponds to the spacing of the elements 31 along the band 30, and the drum 33 is rotated so that its peripheral speed substantially equals the linear speed of the band, the two parts being moved in timed relationship so that successive flutes 34 register with successive elements 31 and cooperate therewith to enclose the cigarettes carried in the elements in a manner about to be described.

Referring also to FIGURE 4, each element 31 comprises end parts 35 and 36 which are spaced apart by a distance slightly greater than the length of a cigarette, and against one, 36, of which an end of the cigarette carried in the element abuts, thus leaving a small space between the other end of the cigarette and the part 35. The flute portion of each element 31 comprises inwardly projecting ring positions 37, 38, 39 and 40 on which the cigarette rests. The flutes 34 on the drum 33 are constructed to correspond to the elements 31, and each flute 34 comprises end parts 41 and 42, which register with the end parts 35 and 36, and inwardly projecting ring portions 43, 44, 45 and 46 which register respectively with the ring portions 37, 38, 39 and 40.

As a flute 34 registers with an element 31, the cigarette contained in the element is enclosed and the ring portions on the two parts register to form substantially airtight seals around the circumference of the cigarette, and the end parts 35 and 41, and 36 and 42 register to form substantially airtight seals opposite the ends of the cigarette. As can best be seen in FIGURE 4, a substantially airtight chamber 47 is formed around the cigarette between the ring portions 38 and 44, and 39 and 45. The ring portions 40 and 46 and the end parts 36 and 42 enclose the end of the cigarette which is in abutment with the end parts, and the ring portions 37 and 43 and the end parts 35 and 41 enclose the other end of the cigarette, a small space 48 being left between the end of the cigarette and the end parts.

Inlets 37a and 39a are provided between the ring portions 37 and 38, and 39 and 40, respectively, in each of the elements 31, and corresponding peripheral grooves 43a and 45a are provided around the drum 33 between the ring portions 43 and 44, and 45 and 46, respectively, of the flutes 34. The provision of these inlets and grooves permits those portions of the cigarette's periphery which register with the grooves and inlets to be open to atmosphere when the cigarette is enclosed as described above, for a purpose to be described later.

The cigarette C in the embodiment shown are mouthpiece cigarettes, each comprising a wrapped tobacco portion joined to a mouthpiece portion by an encircling uniting band which adheres to the two portions.

The drum 33 is mounted on a rotatable shaft 49. Leading from each flute 34, at a position between the ring portions 44 and 45, is a hole 50, radial of the drum, which communicates with a longitudinal hole 51 leading to an end face 52 of the drum. Also leading from each flute 34, at a position between the ring portion 43 and the end part 41, is a secondary radial hole 53 which communicates with a secondary longitudinal hole 54 leading to the end face 52 of the drum. The holes 53 and 54, together with the space 48, constitutes part of a detector-chamber.

The shaft 49 is rotatably mounted in bearings 55, supported in a bracket 56. A stationary carbon ring 57 is urged against the end face 52 of the drum 33 by springs 58 housed in inlets in the bracket 56. An arcuate slot 59 (see FIGURE 3), with which the holes 51 can register, is provided in the ring 57, and there is also provided a secondary arcuate slot 60 (FIGURE 3), in the ring, with which the holes 54 can register. A duct 61 connects the slot 59 through a hole 62 in the bracket 56 to a pipe 63 leading to a source of suction (not shown), and the slot 60 is connected by a pipe 64 passing through a hole 65 in the bracket 56 to a pipe 66 leading to a detector device 67.

The detector device 67 comprises a transducer of known construction, having a diaphragm adapted to move responsively to a pressure drop in a chamber in the transducer, and an armature connected to the diaphragm which moves in a coil on such movement of the diaphragm, thereby producing an electrical signal in a known manner.

The operation of the apparatus is as follows:

Cigarettes C are conveyed sideways (to the left as viewed in FIGURE 3) in succession in the elements 31 on the band 30, and when a cigarette reaches the position directly beneath the shaft 49, a flute 34 of the drum 33 registers with the element 31 carrying the cigarette and encloses the latter in the manner previously described. At approximately the same time, the hole 51 communicating with the flute 34 registers with the slot 59 and suction is therefore applied to the chamber 47 around the cigarette. Suction continues to be applied while the enclosed cigarette is conveyed between the drum 33 and band 30, and the hole 54 then moves into register with the slot 60 so that the secondary chamber, i.e. the chamber containing the inside of the cigarette and the space 48, is connected through the pipe 66 with the detector device 67. Thus a difference in air pressure is established between the chamber 47 and the detector chamber of which the space 48 forms a part.

If the cigarette is faulty in that air can pass through the wrapper, e.g. through a hole in the wrapper or through a gap in the seam of the tobacco portion wrapper or of the uniting band, the application of suction to the chamber 47 will cause air to flow through the fault from the inside of the cigarette into the chamber, and such flow of air will be detected as follows. The flow of air through the wrapper into the chamber 47, resulting from the establishment of the pressure difference above mentioned, will cause a flow of air through the open end of the cigarette adjacent the space 48, and will result in a pressure decrease in the second chamber which will be apparent as a pressure decrease in the space 48, which forms part of a detector-chamber as mentioned above. When the space 48 is connected, by register of the hole 54 with the slot 60, with the detector device 67, such pressure decrease will be communicated to the detector device, thereby causing an electrical signal.

If, on the other hand, the cigarette is not faulty in that respect, the amount of air which will flow through the wrapper into the chamber 47 will depend on the porosity of the wrapper, and the apparatus is arranged so that such flow is insufficient to cause a great enough pressure decrease in the space 48, and hence the detector device, for a signal to be given by the detector device 67.

The connections between the space 48 and the detector device, and between the chamber 47 and the suction source are closed as the holes 51 and 54 respectively move out of register with the slots 59 and 60, and the tested cigarette is conveyed away from the drum 33 in the element 31 on the band 30 as shown in FIGURE 1.

In this manner cigarettes are conveyed and tested in succession, and the signal produced when a faulty cigarette is detected is utilized to reject the cigarette at a later stage.

It has been found that difficulty is often experienced in making perfect seals so that the chamber formed around the cigarette is perfectly airtight, and the present invention provides a method and apparatus whereby an effective testing of cigarettes can be achieved even when the chamber is not perfectly sealed. Thus, if the seals effected by the ring portions 38 and 44, and 39 and 45 are not perfect, so that a small leak between the ring portions and the cigarette can occur, the pressure in the chamber 47 can normally be made sufficiently low to cause the flow of air through a fault in the wrapper, provided that the said leak is sufficiently small. Similarly, if the seals of the second chamber are imperfect, a leak to this chamber will only occur when the pressure in the chamber is lower than that of the surrounding atmosphere, and such lower pressure in the space 48 can normally be detected by the detector device, provided the seal is reasonably effective. Further, by the provision of the grooves 43a and 45a around the drum 33 and the inlets 37a and 39a in the elements 31, separate seals are provided to substantially close each of the said first and second chambers from atmosphere. The purpose of this is to avoid any possible direct communication (other than through the cigarette wrapper) between the two chambers if one of the seals is imperfect, in order that flow of air through the imperfect seal into one chamber should not directly effect the air pressure in the other chamber. Thus, in particular (as can best be seen from FIGURE 2), if the seat around the cigarette formed by the ring portions 38 and 44 should be imperfect, air can leak from atmosphere in the groove 43a through the seal into the chamber 47 when suction is applied to the latter. If, however, the groove 43a were omitted so that a single seal separated the chamber 47 from the space 48, then if this seal were imperfect so that air could flow from the space 48 through the seal and into the chamber 47, when suction is applied to the latter, this alone could result in a pressure drop in the space 48 causing a signal to be given by the detector device 67, thereby giving rise to the possibility of a good cigarette being rejected. It will be appreciated, however, that seals which are as airtight as practicable are desirable.

If desired, the elements 31 and the flutes 34 in the apparatus described, may be adapted to form a space adjacent both ends of the cigarette when the latter is enclosed, and the detector means may be adapted to operate responsively to a pressure decrease in either or both of the said spaces.

It will further be appreciated that, if desired, the apparatus described could be modified so that suction is supplied to the space 48 e.g. by connecting the pipe 66 to a suction source, and a detector device, such as that described above, could be connected to the chamber 47, so that flow of air from the chamber 47 through the wrapper into the space 48 could be detected by detecting a resulting pressure decrease in the chamber 47.

Figure 5:
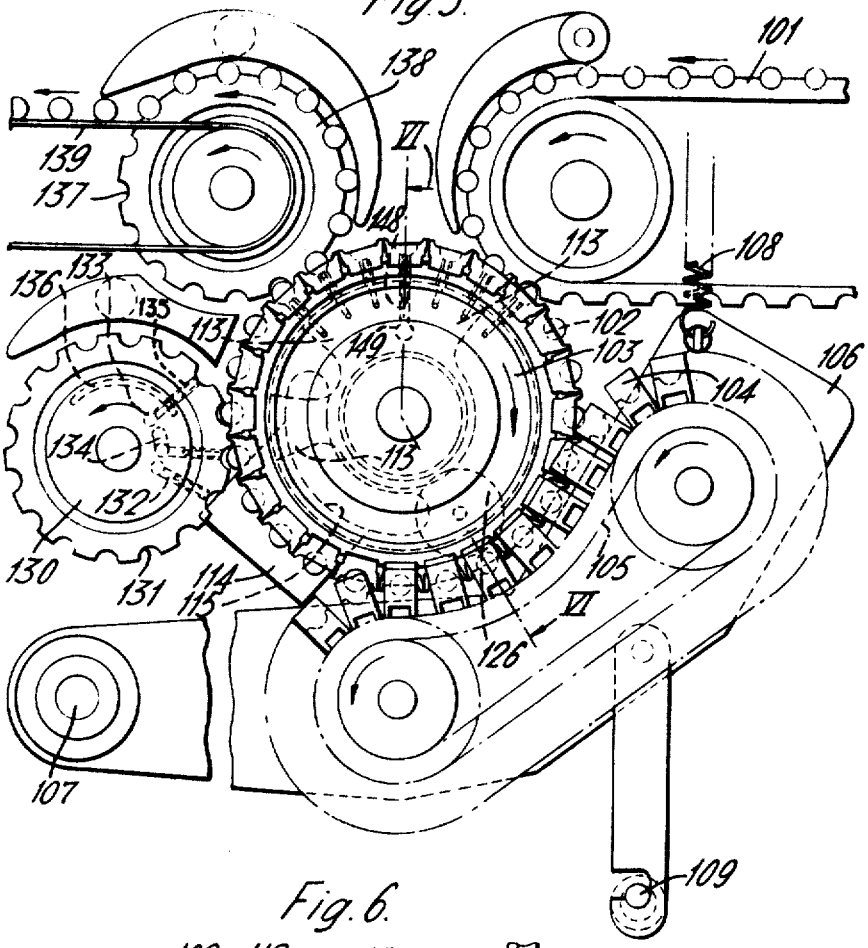
FIGURE 5 is an end elevation of a further alternative construction.
Figure 6:
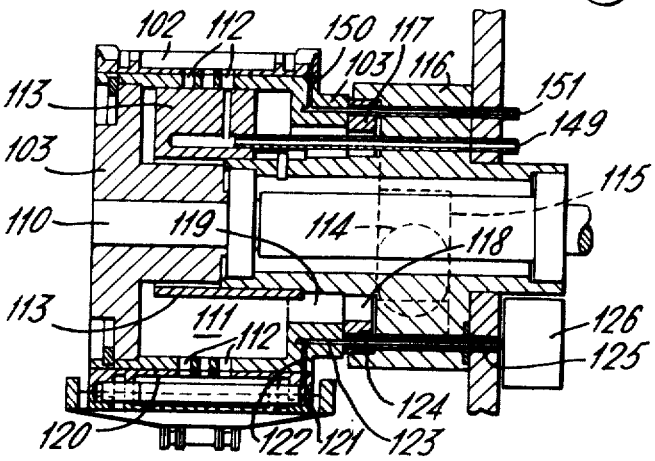
FIGURE 6 is a section on the line VI—VI, FIGURE 5.

FIGURES 5 and 6 illustrate a modification of the construction described above with reference to FIGURES 3 and 4, and in addition, FIGURE 5 illustrates a means of rejecting faulty cigarettes. In this construction, the cigarettes to be tested are delivered by a fluted conveyor 101 into flutes 102 of a drum 103, to which they are held by suction while being carried downwards to a position where the flutes 102 register with fluted elements 104 carried by a flexible conveyor 105. The conveyor 105 passes about pulleys mounted on a movable bracket 106, pivoted at 107, and spring-urged upwardly about its pivot by a light tension spring 108, so as to press the elements 104 yieldingly against the flutes of the drum. Upward movement of the bracket is limited by an eccentric stop pin 109.

The drum 103 is fixed on a shaft 110 and has a hollow interior space 111 communicating through holes 112 with the flutes 102. Within this space 111 is a fixed shutter 113 about which the drum rotates. The shutter is shaped as shown in FIGURE 5 so that parts of it cover the holes 112 and thus blank them off from the space 111. Suction is applied to the space 111 by way of a suction pipe 114 communicating with a chamber 115 arranged within a non-rotating part 116. Between the part 116 and the rotating drum is a ring 117 which is urged by springs (not shown in the drawing) against the end face of the drum and which is provided with an annular passage 118 which communicates with a similar passage 119 in the drum, the passage 119 itself being in communication with the space 111.

It will be seen from FIGURE 5 that the shutter 113 is so shaped that suction in the space 111 is communicated to the flutes 102, through the holes 112, during the whole of the time while the flutes 102 are cooperating with the fluted elements 104, during which time the testing operation takes place in substantially the manner already described with reference to FIGURES 3 and 4.

In the present embodiment, the cigarettes C are so located in the flutes 102 that when a flute 102 is registered with a fluted element 104, forming an airtight chamber 120 which encloses a cigarette, there is (FIGURE 6) a space 121 adjacent one end of the cigarette (which space corresponds to the space 48 in the construction shown in FIGURE 4). A radial hole 122 leads from the space 121 to a hole 123 which communicates, by way of a slot 124 in the ring 117, with a hole 125 in the part 116, which itself communicates with a transducer 126 which is the same as the transducer 67 referred to in connection with FIGURES 3 and 4.

The shutter 113 is so shaped that the holes 112 are in communication with the space 111, and thus have suction applied to them, during most of their travel around the axis of the drum 103. Before a cigarette reaches a position at which it is enclosed in a chamber by registration of its flute 102 with one of the fluted members 104, the suction acts merely to hold the cigarette in its flute. After the testing operation has taken place, and the respective member 104 has moved away from the flute 102, the suction again acts to hold the cigarette to the flute 102 as it moves upwardly.

To the left of the drum 103, as viewed in FIGURE 5, is a rejector drum 130 having flutes 131 from which holes 132 extend radially inwardly of the drum into transverse holes 133. The holes 133 pass into and out of communication with a suction chamber 134, to which strong suction is applied momentarily in response to a signal indicating that an unsatisfactory cigarette is in register with the flute which, at that moment, is in communication with the suction chamber. This operation will shortly be explained with reference to FIGURE 7. Referring still to FIGURE 5, it will be noted that at a position directly opposite the rejector drum 130, the shutter 113 masks the hole 112, so that cigarettes in the flutes 102 at that position are held to the flutes only by static suction. Thus if strong suction is applied to the chamber 134, it will pull a cigarette from its flute 102 into a flute 131 and cause it to be carried around with the drum 130. Additional holes 135 communicate with the flutes 131 and also with a suction chamber 136 to which relatively weak suction is continuously applied. Thus any cigarette pulled into a flute 131 as just described is held in that flute by continued suction, and is carried around the rejector drum 130 to be deposited in any convenient receptacle or conveyor (not shown).

Cigarettes which have not been found to be unsatisfactory are carried up by the drum 103 and transferred into flutes 137 of a further suction drum 138, which deposits them on a conveyor 139. The shutter 111 cuts off suction to the flutes 103 to permit this transfer.

Figure 7:
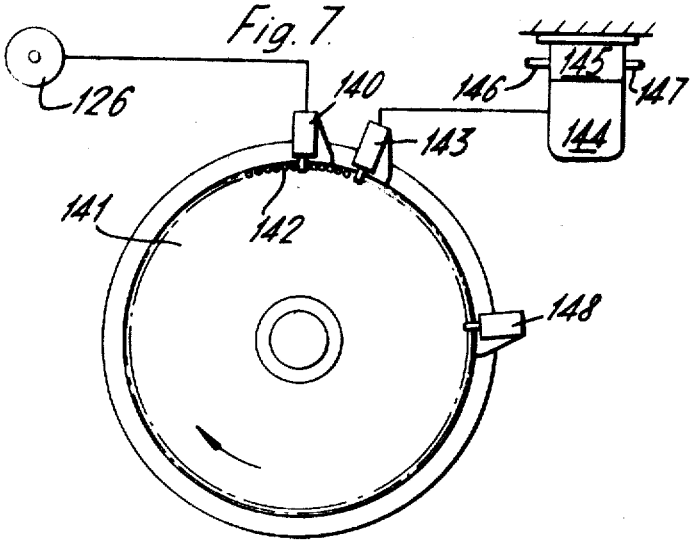
FIGURE 7 shows diagrammatically an arrangement for rejecting faulty rods.

Referring to FIGURE 7, this shows diagrammatically an arrangement for rejecting unsatisfactory cigarettes. The transducer 126 (see also FIGURES 5 and 6) transmits an electrical signal to a "write head" 140 of a delay drum 141. This drum has a series of metal pins 142 movably mounted so as to be capable of being moved by the write head 140 into an operating position such that they will actuate a "read head" 143 after a suitable delay, i.e. the time taken for a pin to travel between the two heads. This operation actuates a solenoid 144 which acts to open momentarily a valve 145 to connect a pipe 146 with a further pipe 147 connected to a suction pump, The pipe 146 communicates with the suction chamber 134, FIGURE 5, and thus suction is applied to the unsatisfactory cigarette and it is pulled on to the rejector drum 130. An "erase head" 148 returns the pin to an inactive position.

Referring again to FIGURES 5 and 6, a hole 148 is provided in the shutter 113 and communicates with one of the holes 112 in each flute 102 and also with a pipe 149 through which air is blown in order to clean the flute of any tobacco dust or shorts which may have been deposited in it. A similar hole 150 communicates with a pipe 151 for the same purpose.

Figure 8:
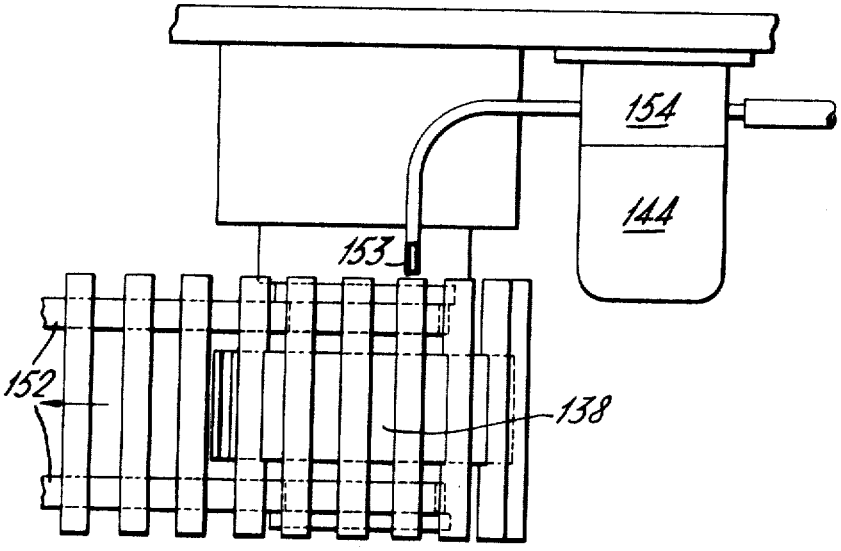
FIGURE 8 shows an alternative rejecting device.

FIGURE 8 shows an alternative arrangement for rejecting unsatisfactory cigarettes. In this arrangement the rejector drum 130 is omitted, and all cigarettes are transferred on to the drum 138, which transfers them on to a pair of conveyor bands 152. An air nozzle 153 is connected through a valve 154 to an air pump (not shown) by which, when the valve is opened, air is blown in a short blast through the nozzle 153. The valve is operated by a solenoid 144 actuated in the manner described with reference to FIGURE 7. Thus an unsatisfactory cigarette is blown lengthwise off the conveyor bands 152.

What I claim as my invention and desire to secure by Letters Patent is:

1. Apparatus for testing the wrappers of wrapped rods having unwrapped ends, comprising means to feed rods in succession to a testing station, a testing device at said testing station adapted to test each rod in turn, said device including sealing means having parts arranged to engage a rod closely forming a chamber around the exterior of the wrapper and sealing off the exterior of the wrapper from the unwrapped ends of the rod, and suction means to apply suction to said chamber, said chamber and sealing means being so disposed that the action of the suction means establishes a difference in air pressure between the interior of the rod and a space surrounding the exterior of the wrapper, and that any air flow occurring as a result of the establishment of such pressure difference, is an air flow through the wrapper into said chamber, whereby any such airflow beyond a predetermined minimum indicates a leak in the wrapper.

2. Apparatus as claimed in claim 1, wherein the said chamber encloses at least the greater part of the exterior of the wrapper.

3. Apparatus as claimed in claim 2, including means to enable air to enter the rod through at least one of its unwrapped ends.

4. A testing device for testing the wrappers of wrapped rods having unwrapped ends, the device including sealing means having parts arranged to engage the rod closely forming a chamber around at least the greater part of the exterior of the wrapper and sealing off the exterior of the wrapper from the unwrapped ends of the rod, suction means to apply suction to the said chamber, said chamber and sealing means being so disposed that the action of the suction means establishes a difference in air pressure between the interior of the rod and a space surrounding the exterior of the wrapper, and that any air flow occurring as a result of the establishment of such pressure difference is an air flow through the wrapper into said chamber, whereby any such air flow beyond a predetermined minimum indicates a leak in the wrapper, means to enable air to enter the rod through one of its unwrapped ends and closure means to close the other of the unwrapped ends of the rod.

5. A device as claimed in claim 4, including detector-means responsive to flow of air into the said one end of the rod.

6. A device as claimed in claim 4, including a detector-chamber to enclose the said one end of the rod, and means to indicate a decrease in air pressure in said detector-chamber, beyond a predetermined minimum, resulting from said pressure difference.

7. Apparatus for testing the wrappers of wrapped rods having unwrapped ends, comprising means to feed rods in succession to a testing station, a testing device at said testing station adapted to test each rod in turn, said device including sealing and chamber-forming means having parts arranged to engage the rod closely to form a chamber enclosing at least part of the exterior of the wrapper so as to seal off said part of the wrapper from the unwrapped ends of the rod, detector means responsive to air flow into at least one unwrapped end of the rod, and suction means to apply suction to said chamber to establish a difference in air pressure between the interior of the rod and a space round said part of the exterior of the wrapper, so that any air flow through a leak in the wrapper occurring as a result of the establishment of said pressure difference can be detected by said detector means.

8. A testing device for testing the wrappers of wrapped rods having unwrapped ends, the device including sealing means having parts arranged to engage the rod closely forming a chamber around at least part of the exterior of the wrapper and sealing off the exterior of the wrapper from the unwrapped ends of the rod, suction means to apply suction to said chamber, said chamber and sealing means being so disposed that the action of the suction means establishes a difference in air pressure between the interior of the rod and a space surrounding the exterior of the wrapper, and that any airflow occurring as a result of the establishement of such pressure difference is an air flow through the wrapper into the said chamber, whereby any such airflow beyond a predtermined minimum indicates a leak in the wrapper, and detector means including a movable element so located as to be adjacent an unwrapped end of the rod, and adapted to move in response to air flow into said end.

9. A device as claimed in claim 8, wherein said movable element forms part of a capacitor whose capacitance is changed by movement of the movable element.

10. A device as claimed in claim 8 wherein said detector means includes two said movable elements so located as to be one adjacent each unwrapped end of the rod and adapted to move in response to air flow into such end.

11. A testing device for testing the wrappers of wrapped rods having unwrapped ends, the device including sealing and chamber-forming means having parts arranged to engage the rod closely to form a chamber enclosing at least part of the exterior of the wrapper so as to seal off said part of the wrapper from the unwrapped ends of the rod, suction means to apply suction to said chamber to establish a difference in air pressure between the interior of the rod and a space round said part of the wrapper, a detector-chamber arranged to enclose an unwrapped end of the rod and to communicate with the interior of the rod through said end, and means to detect a decrease in air pressure in said detector-chamber, beyond a predetermined minimum, resulting from said pressure difference and indicating flow of air through a leak in the wrapper.

12. A device as claimed in claim 11, including means to close the other unwrapped end of the rod.

13. Apparatus as claimed in claim 1, including detector-means to detect a change of air pressure resulting from the establishment of the said pressure difference, such change resulting from a flow of air through the wrapper.

14. A testing device for testing the wrappers of wrapped rods having unwrapped ends, the device including sealing means having parts arranged to engage the rod closely forming a chamber around a part of the rod and sealing off the exterior of the wrapper from the unwrapped ends of the rod, suction means to apply suction to said chamber, said chamber and sealing means being so disposed that the action of the suction means establishes a difference in air pressure between the interior of the rod and a space surrounding the exterior of the wrapper, and detector means responsive to flow of air into an unwrapped end of the rod caused by decrease in air pressure in the chamber and air flow through the wrapper into the chamber, whereby any such air flow beyond a predetermined minimum indicates a leak in the wrapper.

15. A testing device for testing the wrappers of wrapped rods having unwrapped ends, the device including a first conveyor provided with receivers for rods, a further conveyor opposed to the first and provided with receivers for rods, the receivers on one conveyor being adapted to come successively into register with receivers on the other, wherein the two opposed receivers of a pair, when in register with each other, together provide sealing and chamber-forming means which engage a rod closely and form a chamber enclosing at least part of the rod so as to seal off the exterior of the wrapper from the unwrapped ends of the rod, and suction means to apply suction to said chamber to establish a difference in air pressure between the interior of the rod and a space surrounding the exterior of the wrapper whereby any air flow beyond a predetermined minimum, through the wrapper into said chamber occurring as a result of the establishment of such pressure difference indicates a leak in the wrapper.

16. A device as claimed in claim 15, wherein one of the said conveyors is a rotatable drum whose interior is connected to a source of suction.

17. A device as claimed in claim 15, including pneumatic means, arranged to be actuated as a result of a testing operation, to segregate unsatisfactory rods from satisfactory rods.

*18. Apparatus for testing cigarettes and similar rod-like articles having an air-pervious filling and an open ended wrapping for the filling comprising conveyor means to convey a continuous stream of the articles transversely to their lengths, means to establish an air pressure difference between the interior and the exterior of the article across the wall of the wrapping, signal means to produce a test signal related to air flow between the exterior and the interior of the article through the wrapping, and holding means to locate an article in relation to the conveyor means during testing and to provide means to restrict flow of air between the interior of the article and atmosphere through an end of the article, wherein the holding means comprises a plurality of parts which cooperate to encircle an article near said end and which parts are relatively movable apart transversely of the lengths of the articles to receive the articles.*

*19. An apparatus for testing the integrity of cigarettes and similar articles wherein a tubular wrapping having a cylindrical surface and two end portions is provided with openings connected by a restricted flow path, comprising a testing conveyor arranged to support and to advance the articles to be tested; at least one coupling device including first sealing means carried by said conveyor adjacent to one end portion of the wrapper on an article supported by the conveyor, to partially surround said one end portion of the wrapper and second sealing means arranged to cooperate with said first sealing means for completely surrounding said one end portion of the wrapper, said second sealing means being movable with reference to the first and second means form an enclosure enclosing said one end portion of the wrapper and circumferentially engaging said cylindrical surface of said wrapper in sealing relationship at said one end portion thereof, and a second position in which at least said one sealing means is moved out of contact with said cylindrical surface of said wrapper; and actuating means for moving at least said one sealing means.*

*20. Apparatus for testing the wrappers of wrapped rods having unwrapped ends, comprising means to feed rods transversely of their longitudinal axes in succession along a path through a testing station, a testing device at said testing station adapted to test each rod in turn, said device including sealing means having parts arranged to engage a rod closely forming a chamber around the exterior of the wrapper and restricting flow of air between the interior of the wrapper and the atmosphere through both the unwrapped ends of the rod, means defining a space communicating with one end of the rod at the testing station, and means for establishing a pressure differential to produce an air flow along a path extending between said chamber and said space, which path extends radially through the rod wrapper, and including pressure detector means sensitive to air pressure dependent upon the rate of air flow along said path, said means for establishing a pressure differential comprising a source of air at a pressure different from atmospheric and being in communication with one end of said path, while said pressure detector means communicates with the air flow path adjacent to its other end.*

*21. Apparatus according to claim 20 in which said means for establishing a pressure differential to produce said air flow along said path comprises a suction pressure source which is in communication with said chamber around the exterior of the wrapper.*

*22. Apparatus according to claim 21 in which said means for feeding rods in succession to a testing station comprises a hollow drum conveyor, said parts of said sealing means comprising flutes on said drum, and the source of suction pressure is in communication with the chamber around the wrapper via the interior of said drum conveyor.*

*23. Apparatus according to claim 22 wherein said parts of said sealing means further comprise a closure device movable in register with said drum conveyor for closely forming a chamber round the exterior of the wrapper of each rod.*

*24. Apparatus according to claim 20 in which the sealing means further comprises means defining an internal circumferential groove communicating with atmosphere so as to prevent air flow direct between said space and said chamber through the sealing means.*

*25. Apparatus for testing the wrappers of wrapped rods having unwrapped ends, comprising means to feed rods transversely of their longitudinal axes in succession along a path through a testing station, a testing device at said testing station adapted to test each rod in turn, said device including sealing means having parts arranged to engage a rod closely, forming a chamber around the exterior of the wrapper and restricting flow of air between the interior of the wrapper and the atmosphere through both the unwrapped ends of the rod, and means to establish a greater pressure inside the rod than in said chamber, said chamber and sealing means being so disposed that the action of the pressure difference causes an air flow through the wrapper and into said chamber, whereby any such air flow beyond a predetermined minimum indicates a leak in the wrapper.*

*26. A testing device for testing the wrappers of wrapped rods having unwrapped ends, the device including a first conveyor provided with receivers for rods, a further conveyor opposed to the first and provided with receivers for rods, the receivers on one conveyor being adapted to come successively into register with receivers on the other, wherein the two opposed receivers of a pair, when in register with each other, together provide sealing means which engage a rod closely so as to seal off the exterior of the wrapper from the unwrapped ends of the rod, and means to establish a difference in air pressure between the interior of the rod and the exterior thereof whereby any air flow beyond a predetermined minimum, through the wrapper occurring as a result of the establishment of such pressure difference, indicates a leak in the wrapper.*

*27. A testing device for testing the wrappers of wrapped rods having unwrapped ends, the device including a first conveyor provided with receivers for rods, a further conveyor opposed to the first and provided with receivers for rods, the receivers on one conveyor being adapted to come successively into register with the receivers on the other, wherein the two opposed receivers of a pair, when in register with each other, together provide sealing means which engage each rod closely so as to restrict flow of air between the interior of the wrapper and the atmosphere through the unwrapped ends of the rod, and means to establish a difference in air pressure between the interior of each rod and the exterior thereof whereby any air flow beyond a predetermined minimum through the wrapper occurring as a result of the establishment of such pressure difference, indicates a leak in the wrapper.*

*28. A testing device for testing the wrappers of wrapped rods having unwrapped ends comprising means for conveying cigarettes transversely of their lengths past a testing station, automatically engaging sealing means having parts arranged to engage each rod closely to restrict flow of air between the interior of the wrapper and the atmosphere through the unwrapped ends of the rod, means to establish a difference in air pressure between the interior of the rod and the exterior of each rod in turn while at*

*the testing station, and means for connecting to each rod in turn at the testing station a common detecting means to detect an air flow above a predetermined minimum flow rate through said wrapper resulting from said pressure difference and indicating a leak in the wrapper, said detecting means comprising a movable element communicating with one end of the wrapper for sensing air flow through one end of the wrapper and forming part of a capacitor whose capacitance is changed by movement of the movable element.*

*29. A testing device for testing the wrappers of wrapped rods having unwrapped ends, the device including a conveyor for carrying the rods sideways one at a time through a testing station, sealing means arranged adjacent to both ends of each rod while at the testing station to engage each rod closely to seal off the exterior of the wrapper from the unwrapped ends of the rod, means at the testing station to establish a difference in air pressure between the interior and exterior of each rod in turn, pressure-sensitive means at the testing station to detect in relation to each rod in turn the presence of a leak in the wrapper of the rod producing an air flow through the wrapper, above a predetermined amount, as a result of the said difference in pressure at the testing station, the said pressure-sensitive means comprising a pressure transducer including a movable diaphragm which is subjected on one face to a sequence of pressure signals dependent in turn upon the*

*air flow through the wrapper of each rod at the testing station and which provides an electrical output signal.*

References Cited

The following references, cited by the Examiner, are of record in the patented file of this patent or the original patent.

UNITED STATES PATENTS

| | | | |
|---|---|---|---|
| 2,013,402 | 9/1935 | Cameron | 73—45.2 |
| 2,761,311 | 9/1956 | Baker | 73—46 |
| 2,951,364 | 9/1960 | Sherrill | 73—45.2 |
| 1,861,542 | 6/1932 | McDonald et al. | 73—45.2 |
| 2,612,908 | 10/1952 | Tate et al. | 73—211 X |
| 2,667,786 | 2/1954 | Spaulding | 73—398 |
| 3,115,767 | 12/1963 | Tyrrell et al. | 73—38 |
| 3,408,858 | 11/1968 | Keading et al. | 73—45.2 |

FOREIGN PATENTS

| | | |
|---|---|---|
| 1,025,173 | 2/1958 | Germany. |

LOUIS R. PRINCE, Primary Examiner

W. A. HENRY II, Assistant Examiner

U.S. Cl. X.R.

73—41, 45.2

UNITED STATES PATENT OFFICE

CERTIFICATE OF CORRECTION

Patent No. RE 27,277 Dated January 18, 1972

Inventor(s) David T. N. Williamson

It is certified that error appears in the above-identified patent and that said Letters Patent are hereby corrected as shown below:

Column 1, cancel lines 4, 5 and 6 and substitute:

-- Original No. 3,266,295, dated August 16, 1966, Ser. No. 291,905, July 1, 1963. Continuation of reissue application Ser. No. 758,639, August 16, 1968, now abandoned. This application for reissue April 7, 1970, Ser. No. 26,447. --

Between lines 7 and 8, insert:

-- Claims priority, application Great Britain, July 6, 1962, 26,111/62 --

Signed and sealed this 26th day of September 1972.

(SEAL)
Attest:

EDWARD M. FLETCHER, JR.
Attesting Officer

ROBERT GOTTSCHALK
Commissioner of Patents

USCOMM-DC 60376-P69
☆ U.S. GOVERNMENT PRINTING OFFICE : 1969 O—366-334